United States Patent
Coburn et al.

(10) Patent No.: US 8,202,345 B2
(45) Date of Patent: Jun. 19, 2012

(54) METHOD OF PRODUCING NON-PYROPHORIC METALLIC IRON

(75) Inventors: James L. Coburn, Hersey, MI (US); John L. Sullivan, Houston, TX (US)

(73) Assignee: Premier Enviro Services, Inc., Houston, TX (US)

(*) Notice: Subject to any disclaimer, the term of this patent is extended or adjusted under 35 U.S.C. 154(b) by 0 days.

(21) Appl. No.: 12/800,843

(22) Filed: May 24, 2010

(65) Prior Publication Data

US 2010/0300246 A1 Dec. 2, 2010

Related U.S. Application Data

(60) Provisional application No. 61/182,004, filed on May 28, 2009.

(51) Int. Cl.
*C22B 1/22* (2006.01)
*C22B 19/04* (2006.01)

(52) U.S. Cl. .............. 75/479; 75/481; 75/770

(58) Field of Classification Search .......... 75/770, 75/479, 481
See application file for complete search history.

(56) References Cited

U.S. PATENT DOCUMENTS

| | | | |
|---|---|---|---|
| 3,895,088 A | 7/1975 | Goksel | 264/82 |
| 4,063,930 A | 12/1977 | Kusner et al. | 75/3 |
| 4,528,029 A | 7/1985 | Goksel | 75/3 |
| 4,673,431 A * | 6/1987 | Bricmont | 75/694 |
| 4,814,005 A * | 3/1989 | Thompson | 75/768 |
| 5,554,207 A | 9/1996 | Bogdan et al. | 75/500 |
| 5,865,875 A | 2/1999 | Rinker et al. | 75/436 |
| 6,254,665 B1 | 7/2001 | Matsushita et al. | 75/484 |
| 6,258,149 B1 | 7/2001 | Sugiyama et al. | 75/484 |
| 6,270,551 B1 | 8/2001 | Rinker et al. | 75/484 |
| 6,379,421 B1 * | 4/2002 | Salinas-Fernandez et al. | 75/444 |
| 6,579,505 B2 | 6/2003 | Tsuchiya et al. | 423/138 |
| 6,592,647 B2 | 7/2003 | Hino et al. | 75/500 |
| 6,605,130 B2 | 8/2003 | Takenaka et al. | 75/319 |
| 6,811,759 B2 | 11/2004 | Tsuchiya et al. | 423/138 |
| 6,918,947 B2 | 7/2005 | Maki et al. | 75/484 |
| 7,513,929 B2 * | 4/2009 | Bratina et al. | 75/10.17 |
| 2008/0210537 A1 * | 9/2008 | Puvvada | 201/4 |

* cited by examiner

*Primary Examiner* — George Wyszomierski
*Assistant Examiner* — Tima M McGuthry Banks
(74) *Attorney, Agent, or Firm* — M. Susan Ochoa Spiering

(57) ABSTRACT

A method for producing a substantially metallic iron-containing product from iron oxide. The metallic iron produced according to the invention is non-pyrophoric and may be safely shipped and handled without additional process steps. The method of the invention is simple, economical, and produces high quality metallic product which may be used as a feed for Electric Arc Furnace (EAF), Blast Furnaces and Cupolas among other applications.

15 Claims, 2 Drawing Sheets

METHOD OF PRODUCING NON-PYROPHORIC METALLIC IRON

CLAIM FOR PRIORITY

This non-provisional patent application is based on U.S. Provisional Patent Application Ser. No. 61/182,004, filed May 28, 2009 entitled, "Method of Producing Non-Pyrophoric Metallic Iron". The priority of U.S. Provisional Patent Application Ser. No. 61/182,004 is hereby claimed and its disclosure incorporated herein in its entirety.

TECHNICAL FIELD

The present invention relates very generally to methods for converting iron oxide containing materials into commercially viable metal, and more particularly relates to a method for cold bonding iron oxide agglomerates with internal carbon and subsequently reducing the iron oxides to produce non-pyrophoric metallic iron.

BACKGROUND OF THE INVENTION

Many processes, such as pig iron and steel production, generate byproducts that are rich in iron oxide, but are in the form of fine particles or sludge. Many approaches have been proposed for converting the iron oxide byproduct into commercially viable metallic iron which can be subsequently melted and refined into a metal product. Typically, the iron oxide containing material is combined with a binding agent, and the components are pelletized or otherwise agglomerated and subjected to high temperatures in the presence of a reducing agent. In the final step the iron oxide agglomerate is reduced to metallic iron. Agglomeration of the particles is necessary prior to the reduction step because the reduction gas velocities would blow finely divided material out of the reaction device.

U.S. Pat. No. 4,063,930 to Kusner et al. discloses a process in which particulate iron oxide dust is ground with lime and compacted at temperatures of about 1800° F. The compacted pellets are then subjected to heating in a reducing environment to convert the iron oxide to a ferrous state.

U.S. Pat. No. 3,895,088 to Goksel describes a method for producing iron oxide agglomerations for recovery of iron-rich byproducts of steel factories. The Goskel method entails blending together steel dust, calcium/magnesium oxide, a siliceous material, and optionally a carbonaceous material. The mixture is then moistened with water and pelletized. The pellets are then subjected to hydro-thermal conditions in a steam autoclave to provide integral, high strength agglomerates. A similar process is disclosed in U.S. Pat. No. 4,528,029 to Goksel which is directed to the formation of iron-oxide agglomerates with pyrolyzed carbonaceous materials.

U.S. Pat. No. 5,554,207 to Bogdan et al. teaches a method for recycling waste particulate iron oxide, where the iron oxide particles are agglomerated using water-insoluble thermoplastic resins as binding agents.

U.S. Pat. Nos. 5,865,875 and 6,270,551 both to Rinker et al. describe a process where an iron oxide material and carbonaceous material are agglomerated under high temperatures, without the presence of a binding agent to form "green compacts." The green compacts are then added to a rotary hearth furnace to reduce the iron oxide.

U.S. Pat. No. 6,579,505 and U.S. Pat. No. 6,811,759, both to Tsuchiya et al., relate to a method of producing iron oxide pellets with improved strength by combining the iron oxide component with a carbonaceous material, an inorganic coagulant such as bentonite, and an organic binder such as starch. The materials are combined with water and pelletized into green compacts and subsequently dried prior to the reduction step.

A rotating hearth furnace is used to reduce iron oxide in numerous processes described in patents assigned to Kobe Steel. For example, U.S. Pat. No. 6,254,665 to Matsushita et al. relates to a method of producing reduced iron agglomerates by heating a composition of iron oxide and a carbonaceous substance in a moving hearth furnace. U.S. Pat. No. 6,152,983 to Kamijo et al. describes the reduction of iron oxide containing pellets in a rotary hearth furnace, where the pellets further include zinc oxide and a carbonaceous material. According to Kamijo et al., the pellets are heated to reduce the zinc oxide to zinc, to evaporate the zinc off of the pellets, and to reduce the iron oxide to iron.

Additional references of interest include U.S. Pat. No. 6,258,149 to Sugiyama et al.; U.S. Pat. No. 6,592,647 to Hino et al.; U.S. Pat. No. 6,605,130 to Takenaka et al.; and U.S. Pat. No. 6,918,947 to Maki et al.

Despite the advancements in iron waste reclamation, many conventional processes do not produce iron agglomerates with sufficient strength. For example, many of the above processes use expensive rotary hearth furnaces because the agglomerates lack the strength to withstand the agitation associated with more economical alternatives such as rotary kilns. Indeed, the prior art teaches that the pellets need to be subjected to complicated autoclaving processes in order to achieve suitable strength. Furthermore, the agglomeration and reduction processes in much of the prior art relates to the production of pyrophoric metallic iron, which must be further processed (e.g., by briquetting) to render safe for shipping and handling.

It has been surprisingly discovered according to the present invention that iron containing product may be conveniently and economically produced in a non-pyrophoric form, without the need of additional briquetting or processing steps. According to one aspect of the invention, iron oxide is agglomerated with a carbon source, zinc oxide and calcium or magnesium oxides. In addition to being non-pyrophoric when processed properly, the inventive combination enables the formation of the agglomerates (prior to reduction) at low temperatures and low pressures, yet which still exhibit high strength. Other desirable features of the invention include (1) the production of non-pyrophoric metallic iron; (2) low equipment costs; (3) low operating costs; (4) fewer and simpler process steps; (5) safe handling; (6) shipping convenience and (7) high energy efficiency.

SUMMARY OF THE INVENTION

According to one aspect of the present invention there is provided a method for producing non-pyrophoric iron product comprising the steps of (a) agglomerating slag components: iron oxide, zinc oxide, calcium or magnesium oxide and, a particulate carbon source to form a bonded agglomerate by curing and drying at relatively low temperature; (b) heating the bonded agglomerate to temperatures of at least 900° C.; (c) reducing the iron oxide to metallic iron, to render the product substantially non-pyrophoric.

More particularly, the invention provides a method of producing a substantially non-pyrophoric metallic iron-containing product from virgin and waste iron oxide sources, said method comprising the steps of:

(a) agglomerating slag components:
(i) iron oxide,
(ii) zinc oxide, (iii) calcium and/or magnesium oxide, and,
(iv) a finely divided low volatile carbon source,
Adjusting or blending the slag components to form a slag with a melting point exceeding a kiln treatment temperature by at least 100° C. to avoid a kiln ring formation, and, forming a bonded agglomerate thereof by curing and drying the agglomerates to form a calcium and/or magnesium-zincate bond;
(b) heating the bonded agglomerate of step (a) to temperatures above 900° C. for a time and rate sufficient to reduce and evaporate the zinc oxide;
(c) further increasing the temperature to reduce the iron oxide to metallic iron, wherein about 50 to 100 percent of the iron in the bonded agglomerate is metallized such that a metallic iron containing consolidated product is formed; and
(d) controlling the heating time, heating rate, and temperatures of step (b) such that the consolidated product of step (c) is formed with low specific surface to render the product substantially non-pyrophoric.

Still further features and advantages of the invention are apparent from the following description.

BRIEF DESCRIPTION OF THE DRAWINGS

The invention is described in detail below with reference to the following drawings.

DETAILED DESCRIPTION OF THE INVENTION

Figure 1:
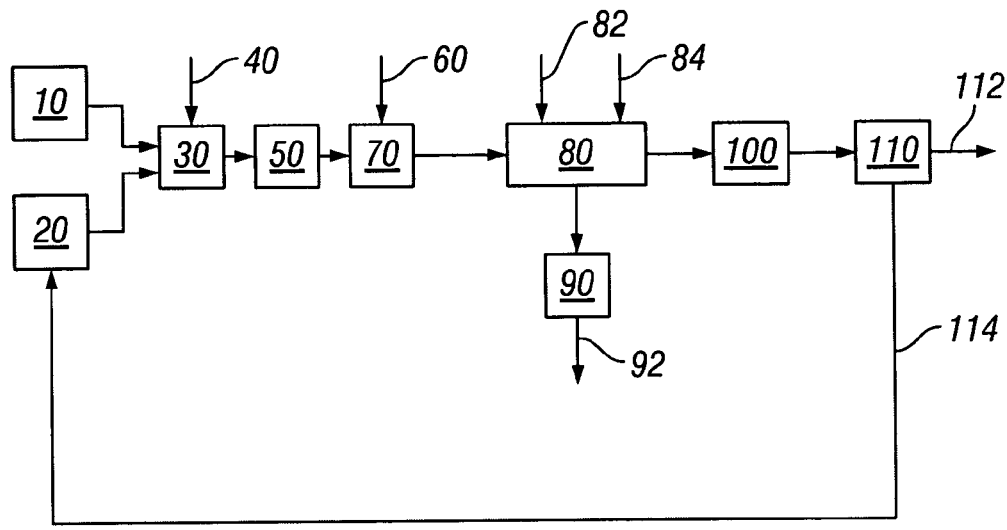
FIG. 1 is a process flow chart which diagrams the steps of producing reduced metallic iron from an iron oxide source.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined below, terminology as used herein is given its ordinary meaning.

"Non-pyrophoric," as used herein, refers to the combustibility of an iron-containing product in air. An iron-containing product is considered substantially non-pyrophoric if it will not spontaneously ignite in air at 130° F.

The process of the invention enables the production of non-pyrophoric metallic iron from iron oxide sources such as waste iron streams, iron ore, or the like. Very generally, iron oxide is agglomerated with zinc oxide, calcium or magnesium oxide, and a carbon source, and is subsequently heated to reduce the iron oxide to metallic iron. The agglomerate may also include a silica source. During heating, the specific surface of the iron particles is greatly reduced such that the metallic iron does not react with air at ambient temperatures and becomes a non-pyrophoric product for shipping and handling purposes.

The source of iron oxide used in the invention is not particularly limited and may be provided from steel plant or iron production waste dust such as dust collected from basic oxygen furnaces, blast furnaces, open hearth, electric furnace processes, mill scale fines, grit chamber dust, and the like, and in particular United Stated Environmental Protection Agency listed hazardous waste K061 EAF dust. Additionally, the iron oxide may be provided from virgin iron ore and concentrates.

The agglomerates produced in the invention also include calcium and/or magnesium oxide. The calcium oxide source can be burnt lime or hydrated lime. Burnt lime may also include some magnesium oxide. Various waste materials contain small amounts of calcium or magnesium oxides and zinc oxide which participate in the bonding process. An example of this is EAF dust which can contain sufficient active calcium oxide that minimizes the need for burned lime addition.

The iron oxide is also agglomerated with a zinc oxide. Conveniently, the zinc oxide source may be provided from electric arc furnace (EAF) dust, in particular K061 EAF dust. Indeed, this dust is preferred as it is believed that K061 EAF dust reacts more strongly with burned lime to form calcium zincate (Ca Zn $O_3$) than commercially available zinc oxide. The increased reactivity may reduce the curing time needed to produce the bonding strength required for the subsequent reduction step.

The above components shall be blended with a finely divided particulate carbon source prior to agglomeration. The inclusion of finely divided internal carbon makes the agglomerates self reducing. Additionally, the finely divided internal carbon in the agglomerate increases the reduction kinetics, and accordingly speeds up the reaction. Typically, the finely divided carbon source has particles small enough such that 90 percent passes through a 200 mesh sieve. The carbon source is not particularly limited and may come from low volatile coal char (which is produced in the reduction step), blast furnace dust, or the like. The use of coal in this inventive process results in a reducing agent, as well as an energy or fuel source. Iron oxide is accordingly mixed with the zinc oxide, calcium or magnesium oxides, and low volatile, finely divided carbon.

Generally, water is also blended with the above-mentioned components in amounts of about 5 to 30 percent, preferably from 5 to 20 or 10 to 20 weight percent. The components are then agglomerated by standard methods such as pellet disc, drum, or extrusion. Screening devices may also be used to produce agglomerates of the desired size. The agglomerates may then be cured by drying at ambient pressure in an atmosphere having a high water vapor content, or by contacting the agglomerates with low pressure steam. Preferably, the agglomerates is cured and dried on a traveling grate that would use a combination of hot air and water vapor to cure, dry and preheat the pellets prior to introduction into a kiln. The inventive process may also utilize the waste energy from the kiln to dry and preheat the agglomerated product. The heating and moisture removal during the curing/drying step may be controlled so that the agglomerates are not destroyed, e.g., by the popcorn effect. Typically, the heating in this step is controlled so the agglomerates are heated at a rate of less than 5° C./min.

Not wishing to be bound by theory, the curing process is thought to be as follows: (1) the calcium oxide reacts with water in the mix to form calcium hydroxide ($Ca(OH)_2$); (2) the zinc oxide reacts in the same way to form acidic zinc oxide; (3) under very mild hydrothermal conditions, the calcium hydroxide and acidic zinc oxide ($H_2$ Zn $O_3$) react together to form calcium zincate (Ca Zn $O_3$.$XH_2$ O) which is a hydrated gelatinous material that assists in the agglomeration; (4) on further heating, the calcium zincate dehydrates, cementing the agglomerate together, with sufficient strength for subsequent process steps.

Advantageously, the agglomerates of the invention may be produced without the need for a complicated autoclaving step which uses steam pressures on the order of 300 psig. Indeed, the inventive agglomerates may be readily cured at temperatures of less than 300° C., less than 200° C., and even at ambient room temperature. Additionally, the agglomerates may be cured at pressures of less than 10 psi, and preferably at substantially atmospheric pressure. Conveniently, atmospheric steam may be used to cure the agglomerates.

The bonded agglomerates produced according to the invention exhibit strength values needed for chemical reduction in equipment, such as rotary kilns. If the bond in the agglomerate is too weak, the motion in the kiln will destroy the agglomerate and make the reduction process unfeasible. Typically, the agglomerates exhibit dry crush strength values of at least 1 pound, preferably at least 2 pounds (measured on an approximately ⅜" by ½" agglomerate).

The iron oxide agglomerates with internal carbon are then heated to reduce the iron oxide to metallic iron. The use of a reducing atmosphere will generally speed up the metallization process, and the reducing atmosphere may be provided by adding coal to the kiln. Desirably, rotary kilns are used to heat the agglomerates. Rotary batch kilns are well known and are typically used to simulate conditions in a continuous kiln. The batch kiln may be refractory lined and natural gas fired. Preferred is a ported rotary kiln which provides the versatility and temperature control that is desired for post reduction consolidation. Ported rotary kilns have ports flush with the interlining of the kiln. The ports are spaced down the length of the cylinder and may be present in any number depending on process demands; eight ports is typical. The ports may be activated to bring fuel and air to the kiln, either over the kiln bed or under the kiln bed.

The temperature, heating rate, and heating time in the kiln may be adjusted depending on the desired characteristics of the consolidated metallic iron product. In particular, the heating variables should be controlled to provide the consolidated product with a non-pyrophoric characteristic. Without intending to be bound by theory, it is believed that the consolidated product may be rendered non-pyrophoric by forming larger iron particles in the metallized product. This greatly reduces the specific surface of the iron, making re-oxidation more difficult. In addition, the prefluxed slag components in the agglomerate tend to seal and prevent air from entering.

Other properties of the metallic product can be adjusted as well. For example, higher levels of metallization generally require the agglomerate to be heated for longer periods of time. Generally, the agglomerate is heated for about one to 4 hours, more suitable from about 1 to 2.5 hours. Typically, the kiln is heated to temperatures of from about 900° C. to 1400° C., and more specifically from about 1000° C. to 1300° C. The kiln is also preferably heated quickly, and rates of about 5° C./min to about 10° C./min may be used.

The kiln is generally heated to temperatures of at least 900° C. (referring to the bed temperature of the kiln), so that zinc, if present, will begin to melt and boil off. The off gas from the kiln contains zinc metal and carbon monoxide that needs to be combusted prior to collection of the zinc fume. The zinc gas can enter a combustion chamber where air would be introduced to burn the zinc gas and carbon monoxide. Alternately, combustion can be conducted near the feed end of the kiln. The combusted gas then enters an energy recovery system. The zinc oxide is removed to form a clean gas stream. The cleaned gas may be used to cure, dry and preheat the pellets on the traveling grate. The collected zinc oxide can be sold to zinc reclaimers or recycled back to the pellet process.

The metallized product discharging from the kiln may enter a water-cooled rotary cooler to reduce the temperature below the re-oxidation point. The cooled product may then be stored in conventional storage bins prior to shipment to the final customer. The metallized product may be used as an iron feed for electric arc furnaces, blast furnaces, basic oxygen furnaces, and cupolas.

After cooling, the coal char from the reducing kiln may be separated from the consolidated metallic product with a dry magnetic separator or any other suitable means. The char may be ground and recycled to the pellet mix. Accordingly, the waste from the process is minimized.

Following is a specific process description outlining one embodiment of the present invention, which is discussed in reference to the process flow diagram of FIG. 1.

1. A source of iron oxide 10 is intensively mixed with additives 20 in mixer 30, with sufficient water for pellet making from stream 40. The additives include a carbon source for reduction, a zinc oxide source, and a calcium oxide source for bonding. The amount of carbon depends on the degree of metallization that is desired. The amount of zinc oxide and burned lime depends on the strength requirements for subsequent curing, drying and reduction but are generally in the range of two to four percent for each of the two bonding components (dry basis). The water is added in amounts of from about 5-20 percent.
2. This mixture is then agglomerated in either a drum or disc pelletizer 50 in closed circuit with a sizing device to produce the pellet size desired.
3. Should the pellet mixture contain a large percentage of EAF dust it may not be necessary to add calcium oxide. Generally EAF dust contains considerable calcium oxide that can provide sufficient bonding materials for the bonding reaction.
4. The agglomerates are then cured and dried in a manner that is designed to bond the materials in the agglomerates to the necessary strength for subsequent handling and reduction. Steam from stream 60 may be contacted with the agglomerates on a traveling grate 70, where the steam is at atmospheric pressure.
5. The cured and dried pellet is then charged into a rotary kiln 80 and the pellet temperature is increased. Coal can also be charged with the agglomerates to act as fuel from coal feed 82, to provide a reducing atmosphere and also to produce coal char as an internal carbon source for pellet making. Air flow is also provided to the rotary kiln at stream 84. As the temperature increases, the internal carbon in the agglomerate reacts with the metal oxides to produce carbon monoxide and carbon dioxide. At about 930° C. the reduced zinc begins to evolve as a gas that can easily be re-oxidized to zinc oxide and collected as a fume in the energy recovery system 90, to produce zinc product 92. In the case of iron bearing pellets, the rate of metallization is extremely fast once the pellet temperature reaches about 1100° C. A bed temperature of 1200° C. is suggested, however, to produce a consolidated metallized pellet of good internal strength. This consolidation also produces a non-pyrophoric product that allows for safe and simple down-stream handling.
6. The metallized pellet is then discharged from the heating device and cooled in an indirect rotary cooler 100 under a reducing atmosphere.
7. The metallized pellet is then separated from the coal char in magnetic separator 110, to produce the iron-containing product 112. The final product is hard, strong and nearly dust-free. The char composition 114 that is removed in the magnetic separator may be recycled back to feed additives as a particulate carbons source.

Alternately, the cured, unfired pellets can be charged directly to a hot empty, basic oxygen furnace (BOF) or uncharged electric arc furnace (EAF) where the sensible heat of the refractories from the hot turn around can be used to heat the pellets and start reduction of the iron. The subsequent charge of hot metal to the BOF or start of melting the initial scrap charge in the EAF can be used to finish the metalization of the pellets and subsequent recovery of the metal.

Pellets for the BOF will be specially formulated for this application. Best results will be obtained with higher than normal carbon contents due to the presence of an oxidizing atmosphere in the bottom of the vessel. This is also true of the pellets made for charging to an EAF. These are engineered materials and the formulation can be adjusted for the most economic result.

The iron source for these materials can be obtained from waste oxides generated during the steel making operation. The zinc oxide for bonding can be recycled and therefore does not represent a cost to the operation. In most situations, the burned lime becomes part of the slag cover of the BOF and EAF for energy conservation.

EXAMPLES

Example 1

A pellet mix was formulated using 45% iron oxide sludge, 32% blast furnace dust as a carbon source, 19% EAF K061 dust (which contains zinc oxide) and 4% burned lime. Water was added to the mix and it was pelletized. The pellets were dried overnight and then heated in a reducing atmosphere kiln. The metallic iron content peaked at 75 minutes of retention time with just over 72% of the iron metallized. The survival rate of the pellets when charged into a hot kiln and raised in temperature to 1100° C. at 12° C. per minute was excellent. The pellets also were observed to have very little dusting. The process produced a consolidated metallized pellet that was resistant to reoxidation.

Example 2

A pellet mix was formulated using 63.36% of iron oxide sludge, 24.96% blast furnace dust, 7.68% EAF K061 dust and 4.00% burned lime. This simulates a process where the coal char and zinc fumes are recycled. The process also produces a higher-grade product of enhanced value. The blended material was pelletized in a small rotary pan in batches. Water was sprayed into the pan to achieve the desired ball quality. The balls made in the pan were screened at ⅜ inch and ½ inch to provide the batch kiln feed. The agglomerates were prepared at around 16% moisture. The agglomerates were dried over night and tested for strength, prior to being fed into the batch rotary kiln. The compressive strength is tested according to ASTM E382-97.

TABLE 1

| | Agglomerate Strength | | |
|---|---|---|---|
| | Compressive Strength, lbs | | Number 18" |
| Run | Wet | Dry | Drops Wet |
| 1 | 1.6 | 5 | 1 |
| 2 | 2.5 | 5.5 | 2 |
| 3 | 2.7 | 5.8 | 2 |
| 4 | 2.2 | 6 | 0.5 |
| 5 | 3 | 6.8 | 6 |
| 6 | 1.8 | 5.8 | 6 |
| 7 | 2.3 | 5 | 7 |
| 8 | 3.6 | 5 | 8 |

TABLE 1-continued

| | Agglomerate Strength | | |
|---|---|---|---|
| | Compressive Strength, lbs | | Number 18" |
| Run | Wet | Dry | Drops Wet |
| 9 | 2.2 | 5.5 | 6 |
| 10 | 1.6 | 4.3 | 6 |
| 11 | 2.7 | 2.5 | 7 |
| 12 | 1.5 | 6.8 | 8 |
| 13 | 2.6 | 4.4 | 3 |
| 14 | 2.2 | 5.5 | 3 |
| 15 | 2.6 | 4.8 | 2 |
| 16 | 2.8 | 4.2 | 8 |
| 17 | 3.2 | 5.2 | 2 |
| 18 | 2 | 2.1 | 3 |
| 19 | 1.8 | 3.4 | 5 |
| 20 | 2.2 | 2.5 | 8 |
| AVERAGE | 2.4 | 4.8 | 5.4 |

The agglomerates were then heated with coal additions in a 24-inch diameter by 40-inch long batch kiln with a charge weight of 70 pounds in test A, 130 pounds in test B, and 108 pounds in test C. The three sets of data also differ somewhat in their temperature profiles, and heating times.

Figure 2:
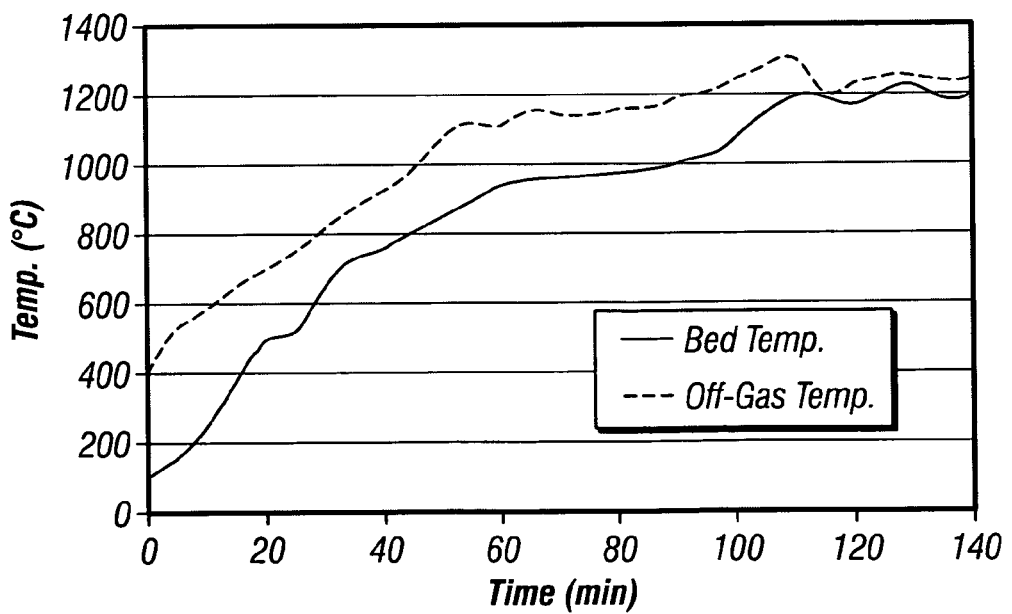
FIG. 2 is a graph illustrating the temperature of a rotating kiln versus time in the batch reduction process of Test A.

In test set A, below, 70 lbs of agglomerates were charged to the kiln with 10 lbs of coal to create a reducing environment. Coal was added periodically as needed to maintain the char in the bed. The kiln holding temp was set to 1150° C. and the kiln speed was 1.75 RPM. The temperature profile of the kiln bed and the off-gas temperature is shown below in Table 2, and illustrated graphically in FIG. 2.

The pellets were fed to the preheated kiln. No evidence of pellet degradation was observed.

TABLE 2

| | Test A | |
|---|---|---|
| Time (min) | Bed Temp. (° C.) | Off-Gas Temp. (° C.) |
| 0 | 157 | 264 |
| 5 | 224 | 302 |
| 10 | 297 | 402 |
| 15 | 378 | 425 |
| 20 | 466 | 458 |
| 25 | 524 | 481 |
| 30 | 553 | 497 |
| 35 | 583 | 512 |
| 40 | 591 | 663 |
| 45 | 677 | 779 |
| 50 | 712 | 893 |
| 55 | 786 | 952 |
| 60 | 837 | 992 |
| 65 | 875 | 1023 |
| 70 | 929 | 1044 |
| 75 | 946 | 1067 |
| 80 | 967 | 1087 |
| 85 | 980 | 1158 |
| 95 | 1032 | 1190 |
| 100 | 1111 | 1232 |
| 105 | 1168 | 1220 |
| 110 | 1177 | 1222 |
| 115 | 1204 | 1236 |
| 120 | 1206 | 1223 |
| 125 | 1211 | 1227 |
| 130 | 1142 | 1234 |
| 135 | 1217 | 1259 |

Samples were removed every 10 minutes after the kiln reached 800° C. When the bed temperature reached about 930° C., a white fume indicating zinc evolution was observed.

Shortly afterwards, the temperature slope dramatically decreased as most of the energy was required for the iron reduction.

Figure 3:
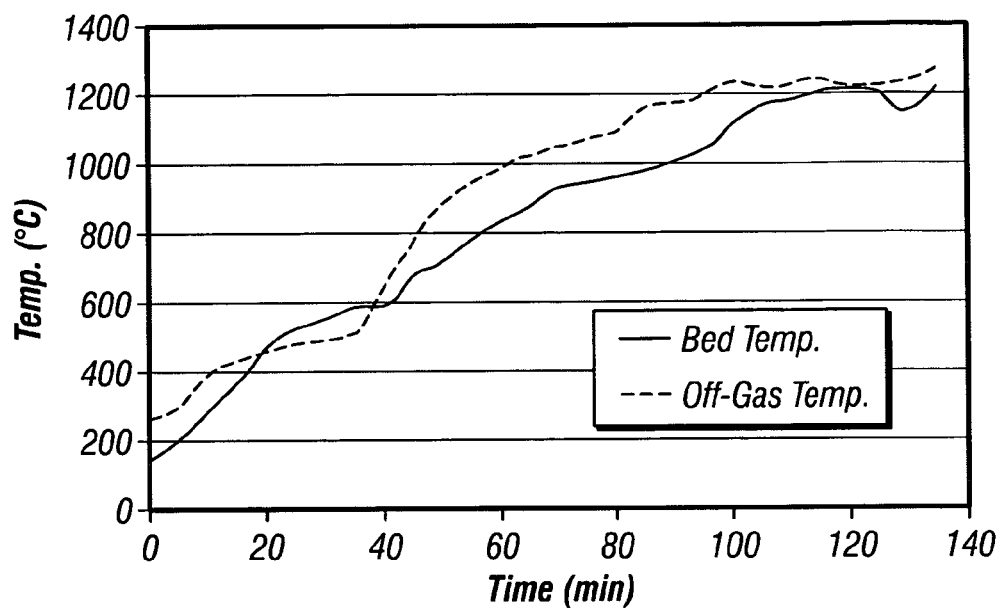
FIG. 3 is a graph illustrating the temperature of a rotating kiln versus time in the batch reduction process of Test B.

In the test B data, 130 lbs of pellets were charged to the kiln with 20 lbs of coal to create a reducing environment. The kiln holding temp was set to 1200° C. and the kiln speed was 1.75 RPM. The temperature was increased somewhat faster than in the first batch; otherwise conditions were similar. The temperature profile of the kiln bed and the off-gas temperature is shown below in Table 3, and illustrated graphically in FIG. 3.

TABLE 3

Test B

| Time (min) | Bed Temp. (° C.) | Off-Gas Temp. (° C.) |
| --- | --- | --- |
| 0 | 109 | 377 |
| 5 | 153 | 525 |
| 10 | 234 | 577 |
| 15 | 376 | 642 |
| 20 | 487 | 685 |
| 25 | 574 | 738 |
| 30 | 643 | 812 |
| 35 | 729 | 872 |
| 40 | 759 | 923 |
| 45 | 804 | 988 |
| 50 | 846 | 1079 |
| 55 | 896 | 1123 |
| 60 | 937 | 1110 |
| 65 | 952 | 1154 |
| 70 | 961 | 1140 |
| 75 | 963 | 1140 |
| 80 | 970 | 1154 |
| 85 | 980 | 1160 |
| 90 | 1002 | 1184 |
| 95 | 1020 | 1201 |
| 100 | 1069 | 1241 |
| 105 | 1142 | 1277 |
| 110 | 1191 | 1249 |
| 115 | 1191 | 1201 |
| 120 | 1175 | 1227 |
| 125 | 1209 | 1247 |
| 130 | 1220 | 1242 |
| 135 | 1186 | 1232 |
| 140 | 1204 | 1243 |

Samples were removed every 10 minutes after the kiln reached 800° C. The test continued until the samples had a metallic appearance. Analysis of the last four samples showed that the metallization decreased somewhat at the end. It appears that the reaction was reversed.

Figure 4:
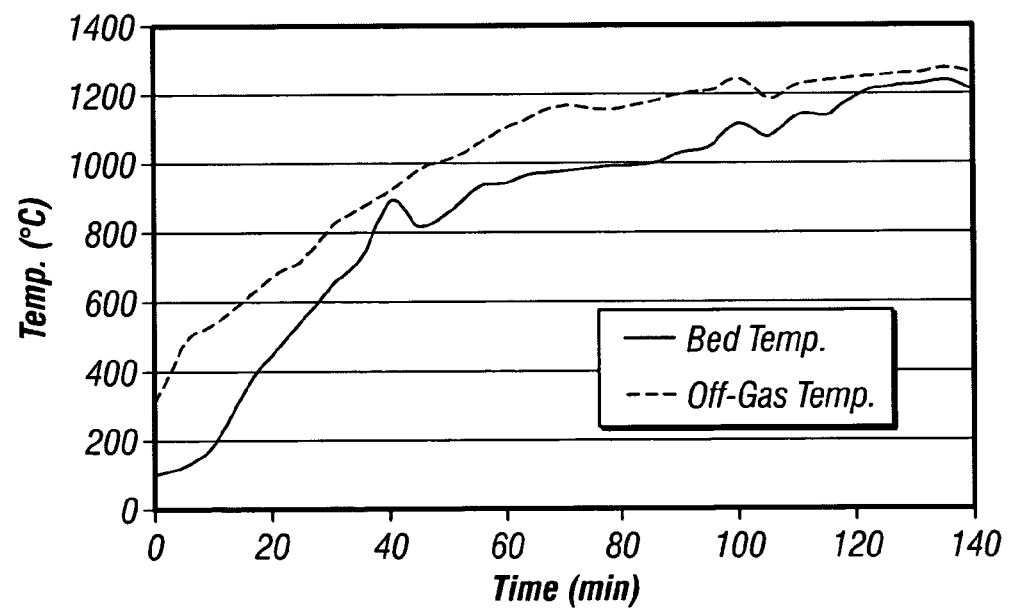
FIG. 4 is a graph illustrating the temperature of a rotating kiln versus time in the batch reduction process of Test C.

For test C, 108.5 lbs of pellets were charged to the kiln with 20 lbs of coal to create a reducing environment. Conditions were similar to the previous batch. The temperature profile of the kiln bed and the off-gas temperature is shown below in Table 4, and illustrated graphically in FIG. 4.

TABLE 4

Test C

| Time (min) | Bed Temp. (° C.) | Off-Gas Temp. (° C.) |
| --- | --- | --- |
| 0 | 101 | 311 |
| 5 | 130 | 485 |
| 10 | 192 | 536 |
| 15 | 333 | 608 |
| 20 | 453 | 670 |
| 25 | 551 | 723 |
| 30 | 654 | 816 |
| 35 | 726 | 870 |
| 40 | 895 | 919 |

TABLE 4-continued

Test C

| Time (min) | Bed Temp. (° C.) | Off-Gas Temp. (° C.) |
| --- | --- | --- |
| 45 | 817 | 987 |
| 50 | 865 | 1014 |
| 55 | 929 | 1054 |
| 60 | 946 | 1102 |
| 65 | 971 | 1138 |
| 70 | 974 | 1168 |
| 75 | 983 | 1159 |
| 80 | 994 | 1163 |
| 85 | 998 | 1175 |
| 90 | 1030 | 1200 |
| 95 | 1047 | 1206 |
| 100 | 1113 | 1244 |
| 105 | 1072 | 1183 |
| 110 | 1134 | 1218 |
| 115 | 1140 | 1240 |
| 120 | 1194 | 1241 |
| 125 | 1212 | 1251 |
| 130 | 1224 | 1256 |
| 132 | 1227 | 1264 |
| 135 | 1237 | 1271 |
| 140 | 1207 | 1263 |

All three tests (A-C) performed extremely well and produced a consolidated product that was hard and strong. Here again, an absence of fines was observed. In this regard, it is believed that the low fines are due to the superior bond produced by the calcium zincates that form from the reaction of the EAF dust and burned lime. Additionally, when molten zinc is present on the surface of the reducing pellets, it may pick up the fines in the charge and adhere them to the surface of the pellets. Typically, the metallized agglomerates (e.g. pellets) of the invention are generally characterized by a substantial absence of fines, i.e., less than 0.5 wt. percent.

The product of the batch kiln from Test B was measured for the tumble test according to ASTM E382-97. Briefly, the test entails screening approximately 25 lbs of pellets on ⅝, ½, ⅜, and ¼ inch, Gilson screens. The weight of the test charge pellets that are retained on each screen are recorded. 25 pounds of plus ¼" pellets are added to an abrasion drum and rotated for 200 revolutions. The pellets are then screened on a series of Gilson screens, and the weights retained on each screen and in the last pan are recorded. The results are shown in Table 5, below.

TABLE 5

Tumbler test

| Screen Size | Test charge Weight (lbs) | Tumbled Product Weight (lbs) |
| --- | --- | --- |
| ⅝" | — | — |
| ½" | 0.01 | — |
| ⅜" | 0.90 | 0.9 |
| ¼" | 24.09 | 23.3 |
| 4M | — | 0.52 |
| 10M | — | 0.03 |
| 30M | — | Trace |
| Pan | — | 0.25 |

As can be seen from the data in Table 5, the material originally charged was 100%+¼". After tumbling, the material was 96.8%+¼".

A summary of the metallized product in Tests A-C is outlined in Table 6, below.

TABLE 6

Summary

| Ex. | Charge (lbs) | Product (lbs) | Samples (lbs) | Recovery (%) | Product Strength (psi) | Test time (min) | Max Temp (° C.) | Product Bulk Density (lb/ft³) |
|---|---|---|---|---|---|---|---|---|
| Test A | 70 | 41.72 | 3.01 | 63.9 | 105 | 135 | 1217 | 102.5 |
| Test B | 130 | 77.94 | 3.00 | 62.3 | 172 | 140 | 1220 | 114.3 |
| Test C | 108.5 | 55.65 | 2.10 | 53.2 | 73 | 140 | 1237 | 83.6 |

While the invention has been illustrated in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A method of producing a substantially non-pyrophoric metallic iron-containing product from virgin and waste iron oxide sources, said method comprising the steps of:
   (a) agglomerating slag components:
      (i) iron oxide,
      (ii) zinc oxide,
      (iii) calcium and/or magnesium oxide, and,
      (iv) a finely divided low volatile carbon source,
      adjusting the slag components of (i)-(iv), to form a slag with a melting point exceeding a kiln treatment temperature by at least 100° C. to avoid a kiln ring formation, and, forming a bonded agglomerate thereof by curing and drying the agglomerates to form a calcium and/or magnesium-zincate bond;
   (b) heating the bonded agglomerate of step (a) to temperatures above 900° C. for a time and rate sufficient to reduce and evaporate the zinc oxide;
   (c) further increasing the temperature to reduce the iron oxide to metallic iron, wherein about 50 to 100 percent of the iron in the bonded agglomerate is metallized such that a metallic iron containing consolidated product is formed; and
   (d) controlling the heating time, heating rate, and temperatures of step (b) such that the consolidated product of step (c) is formed with low specific surface to render the product substantially non-pyrophoric.

2. The method according to claim 1, wherein the calcium oxide is included in the agglomerate.

3. The method according to claim 1, wherein the agglomerates are cured and dried by heating on a traveling grate.

4. The method according to claim 3, wherein the agglomerates are cured and dried by heating at a rate of less than 10° C./min.

5. The method according to claim 4, wherein waste heat from the kiln is used to dry and/or preheat the agglomerate.

6. The method according to claim 1, wherein the kiln is a rotary kiln, and the bonded agglomerate is heated therein.

7. The method according to claim 1, wherein the kiln is a ported kiln, and the bonded agglomerate is heated therein.

8. The method according to claim 1, wherein the bonded agglomerate is heated in a reducing atmosphere by providing a carbon source.

9. The method according to claim 1, wherein the consolidated product is a pellet.

10. The method according to claim 1, wherein the bonded agglomerate is heated to temperatures in the range of from about 900 to about 1400° C.

11. The method according to claim 1, wherein the bonded agglomerate is heated to temperatures in the range of from about 900 to about 1200° C.

12. The method according to claim 1, wherein the bonded agglomerate is heated for at least one hour at an average heating rate of at least about 5° C./min.

13. The method according to claim 1, wherein the bonded agglomerate is heated for at least one hour at an average heating rate of at least about 10° C./min.

14. The method according to claim 1, further comprising the step of cooling the consolidated product in the substantial absence of oxygen.

15. The method according to claim 1, wherein the consolidated product is substantially free of zinc.

* * * * *